United States Patent [19]

Suzuki

[11] Patent Number: 5,893,957
[45] Date of Patent: Apr. 13, 1999

[54] PROCESS FOR PREPARING RADIATION IMAGE STORAGE PANEL

[75] Inventor: Hideki Suzuki, Kanagawa, Japan

[73] Assignee: Fuji Photo Film Co., Ltd., Kanagawa, Japan

[21] Appl. No.: 09/022,639

[22] Filed: Feb. 12, 1998

[30] Foreign Application Priority Data

Feb. 12, 1997 [JP] Japan ................................. 9-044645
Apr. 22, 1997 [JP] Japan ................................. 9-118808

[51] Int. Cl.$^6$ .................... B44C 1/165; B32B 31/00; B32B 27/00; H05B 33/00

[52] U.S. Cl. ................... 156/230; 156/235; 156/247; 156/249; 250/472.1; 250/484.4; 427/157; 428/421

[58] Field of Search ............... 156/67, 230, 235, 156/238, 241, 247, 248, 249; 427/157, 162; 428/421, 422, 694 TF; 250/472.1, 484.4

[56] References Cited

U.S. PATENT DOCUMENTS 4,567,371 1/1986 Ishizuka et al. ..................... 250/483.1
5,023,461 6/1991 Nakazawa et al. .................. 250/484.1

Primary Examiner—David A. Simmons
Assistant Examiner—J. A. Lorengo
Attorney, Agent, or Firm—Birch, Stewart, Kolasch & Birch, LLP

[57] ABSTRACT

A process for preparing a radiation image storage panel composed of the steps of preparing a multi-layer sheet composed of a flexible base, an adhesive layer and a transparent resin film; coating a fluororesin layer on the resin film; peeling the base together with the adhesive layer from the fluororesin-coated sheet; forming an adhesive agent layer on the multi-layer sheet on the side having no fluororesin layer; covering the adhesive agent layer with a protective film; and placing under pressure on a beforehand prepared stimulable phosphor sheet composed of a support and a stimulable phosphor layer the multi-layer sheet after removing the protective film so that the adhesive agent layer can be brought into contact with the phosphor layer.

10 Claims, 2 Drawing Sheets

PROCESS FOR PREPARING RADIATION IMAGE STORAGE PANEL

FIELD OF THE INVENTION

The present invention relates to a process for the preparation of a radiation image storage panel. Further, the invention also relates to a multi-layer sheet having a coated fluororesin layer. The multi-layer sheet is advantageously employable for the preparation of a radiation image storage panel.

BACKGROUND OF THE INVENTION

A radiation image recording and reproducing method utilizing a stimulable phosphor described is now practically employed. In the method, a radiation image storage panel comprising a stimulable phosphor (i.e., stimulable phosphor sheet) is employed, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. After a series of those steps, the radiation image storage panel thus treated is subjected to a step for erasing a radiation image remaining therein, and then is stored for the next radiation image recording and reproducing procedure. Thus, the radiation image storage panel can be repeatedly employed.

In the radiation image recording and reproducing method, a radiation image is obtainable with a sufficient amount of information by applying a radiation to the object at a considerably smaller dose, as compared with a conventional radiography using a combination of a radiographic film and radiographic intensifying screen. Further, the method is very advantageous from viewpoint of conservation of resource and economic efficiency because the radiation image storage panel can be repeatedly used in the method, while the radiographic film is consumed for each radiographic process in the conventional radiography.

The radiation image storage panel commonly employed in the above-described method has a basic structure comprising a support, a stimulable phosphor layer, and a protective film overlaid in order. The phosphor layer generally comprises a binder and a stimulable phosphor dispersed therein. However, there is also known a phosphor layer comprising agglomerate of a stimulable phosphor without binder. The phosphor layer containing no binder can be formed by deposition process or firing process. Further, there is known a phosphor layer comprising agglomerate of a stimulable phosphor impregnated with a polymer material. A radiation image storage panel having any of the above phosphor layers can be used for the radiation image recording and reproducing method.

As is described above, a film of transparent polymer material is generally placed on the phosphor layer so as to protect the phosphor layer. The protective film is generally formed by following two conventional methods. The first method comprises the steps of applying a resin solution onto the surface of the phosphor layer and drying the coated solution (coating method). The second method comprises placing a beforehand prepared transparent resin film on the surface of the phosphor layer via an adhesive layer (film adhering method). Although the coating method comprises a relatively simple procedure and gives the film having strong adhesion, the formed film has such insufficient physical strength that the surface of the coated protective layer sometimes suffers abrasion. On the other hand, the film adhering method comprises a relatively complicated procedure, which generally comprises the steps of beforehand preparing a transparent resin film having an adhesive layer and placing the film on the surface of the phosphor layer. The conventional protective film formed by either method has an advantageous feature in that the protective layer is liable to be stained when the radiation image storage panel having the protective film is conveyed in an apparatus for the radiation image recording and reproducing method, and further it is difficult to remove thus formed stains.

The radiation image storage panel is repeatedly used in the cyclic procedure comprising the steps of exposing to a radiation (for recording of a radiation image), irradiating with stimulating rays (for reading of the recorded image), and exposing to an erasing light (for erasing the remaining image). In this procedure, the panel is transferred from one stage to another stage by means of conveying means such as belt and rolls in the apparatus, and after a cycle of steps is conducted, the panel is piled up on other panel and stored for next cycle. Since the surface of the panel is directly touched to the conveying means (e.g., belt and rolls) during conveying, stains and abrasions are sometimes produced. The stains and the abrasions thus produced on the protective film disturb passages of the stimulating ray and the stimulated emission, and consequently make the resultant image quality poor.

In order to solve the above problem, several improvements are proposed. In copending U.S. patent application Ser. No. 08/469,761 and U.S. Pat. No. 5,227,253, for example, improved protective films are proposed. The proposed films are prepared by applying a coating solution containing a fluororesin onto the surface of the phosphor layer and dried to form a fluororesin-contained protective film. It is stated that the stains and abrasions are hardly produced on the surface of the protective film thus prepared, and further the stains on the surface are easy to remove.

Although the above-mentioned prior arts solve the problem concerning the stains on the protective film, they cannot satisfactorily inhibit occurrence of the abrasions. U.S. patent application Ser. No. 08/834,772 discloses a method for preparing a protective film free from both stains and the abrasions. The method comprises the steps of placing a hard plastic film on the surface of the phosphor layer and then forming a coated fluororesin layer on the surface of the plastic film, to prepare a protective film comprising the plastic film and the coated fluororesin layer provided thereon.

The above-mentioned method effectively keeps the protective film from both stains and abrasions, and therefore a protective film can be advantageously prepared in accordance with the above method in a process for the preparation of radiation image storage panel. However, the inventor has found the problem of the above method: that is, it is not always easy to evenly form a coated fluororesin layer on the surface of the plastic film fixed on the phosphor layer with adhesive. The reason of this trouble appears as follows. Since the films provided on the phosphor layer are required to have a small total thickness so as to obtain a resultant image of a high quality, a very thin film is generally used as the protective film. Consequently, the protective film is so thin that roughness of the phosphor layer surface appears on the protective film surface, and the roughness sometimes further appears on the fluororesin layer coated on the plastic film surface.

Moreover, it is not easy to form a thin coated fluororesin layer on the surface of a multi-layer sheet comprising a support, a stimulable phosphor layer and a plastic film. Although this trouble can be avoided by a method comprising the steps of beforehand forming a coated fluororesin layer on the plastic film and then sticking the plastic film with adhesive onto the surface of the phosphor layer, it is not easy to prepare a thin plastic film having both a coated fluororesin layer provided on one surface and an adhesive layer provided on the other surface.

SUMMARY OF THE INVENTION

The present invention resides in a process for the preparation of a radiation image storage panel comprising a support, a stimulable phosphor layer, an adhesive layer, a transparent resin film and a coated fluororesin layer, in order, which comprises the steps of:

preparing a multi-layer sheet comprising a flexible base, an adhesive layer and a transparent resin film overlaid in order;

forming a coated fluororesin layer on the transparent resin film of the multi-layer sheet;

peeling the flexible base, together with the adhesive layer, from the multi-layer sheet having the coated fluororesin layer;

forming an adhesive agent layer on the multi-layer sheet on the side having no coated fluororesin layer;

covering the adhesive agent layer of the multi-layer sheet with a protective film; and placing under pressure on a beforehand prepared stimulable phosphor sheet comprising a support and a stimulable phosphor layer the multi-layer sheet after removing the protective film therefrom so that the adhesive agent layer of the multi-layer sheet can be brought into contact with the stimulable phosphor layer.

The invention also resides in a continuous process for preparing a radiation image storage panel comprising a support, a stimulable phosphor layer, an adhesive agent layer, a transparent resin film and a coated fluororesin layer, in order, which comprises the steps of:

preparing a longitudinal multi-layer sheet comprising a flexible base, an adhesive layer and a transparent resin film overlaid in order;

forming a coated fluororesin layer on the transparent resin film of the multi-layer sheet, while moving the sheet in its longitudinal direction;

peeling the flexible base, together with the adhesive layer, from the multi-layer sheet having the coated fluororesin layer, while moving the sheet in the longitudinal direction;

forming an adhesive agent layer on the multi-layer sheet on the side having no coated fluororesin layer, while moving the sheet in the longitudinal direction;

covering the adhesive agent layer of the multi-layer sheet with a protective film, while moving the sheet in the longitudinal direction;

placing under pressure on a beforehand prepared continuous stimulable phosphor sheet comprising a support and a stimulable phosphor layer the continuous multi-layer sheet after removing the protective film therefrom so that the adhesive agent layer of the multi-layer sheet can be brought into contact with the stimulable phosphor layer;

and cutting thus covered continuous stimulable phosphor sheet into pieces of the predetermined size.

In each of the above-described processes of the invention, the adhesive layer, which bonds the flexible base (temporary support) to the transparent resin film (protective film of the resultant radiation image storage panel), is removed and then the adhesive agent layer is provided on the bared surface of the transparent resin film. However, the adhesive layer of the multi-layer sheet can be left and employed as the adhesive agent layer for binding the protective film to the stimulable phosphor layer of the stimulable phosphor sheet.

Accordingly, the invention further provides a process for preparing a radiation image storage panel comprising a support, a stimulable phosphor layer, an adhesive agent layer, a transparent resin film and a coated fluororesin layer, in order, which comprises the steps of:

preparing a multi-layer sheet comprising a flexible base, an adhesive agent layer and a transparent resin film overlaid in order;

forming a coated fluororesin layer on the transparent resin film of the multi-layer sheet;

peeling the flexible base from the multi-layer sheet having the coated fluororesin layer;

and placing under pressure on a beforehand prepared stimulable phosphor sheet comprising a support and a stimulable phosphor layer the multi-layer sheet after removing the protective film therefrom so that the adhesive agent layer of the multi-layer sheet can be brought into contact with the stimulable phosphor layer.

The invention further provides a continuous process for preparing a radiation image storage panel comprising a support, a stimulable phosphor layer, an adhesive layer, a transparent resin film and a coated fluororesin layer, in order, which comprises the steps of:

preparing a continuous multi-layer sheet comprising a flexible base, an adhesive agent layer and a transparent resin film overlaid in order;

forming a coated fluororesin layer on the transparent resin film of the multi-layer sheet, while moving the sheet in its longitudinal direction;

peeling the flexible base from the multi-layer sheet having the coated fluororesin layer, while moving the sheet in the longitudinal direction;

placing under pressure on a beforehand prepared continuous stimulable phosphor sheet comprising a support and a stimulable phosphor layer the multi-layer sheet after removing the protective film therefrom so that the adhesive agent layer of the multi-layer sheet can be brought into contact with the stimulable phosphor layer, while moving the sheet in the longitudinal direction;

and cutting thus covered continuous stimulable phosphor sheet into pieces of the predetermined size.

In addition, the invention further provides a multi-layer sheet favorably employable for the above-mentioned processes which comprises a flexible base having a thickness of 20 to 300 μm, an adhesive agent layer, a transparent resin film having a thickness of 1 to 30 μm, and a coated fluororesin layer in order.

DETAILED DESCRIPTION OF THE INVENTION

Figure 1:
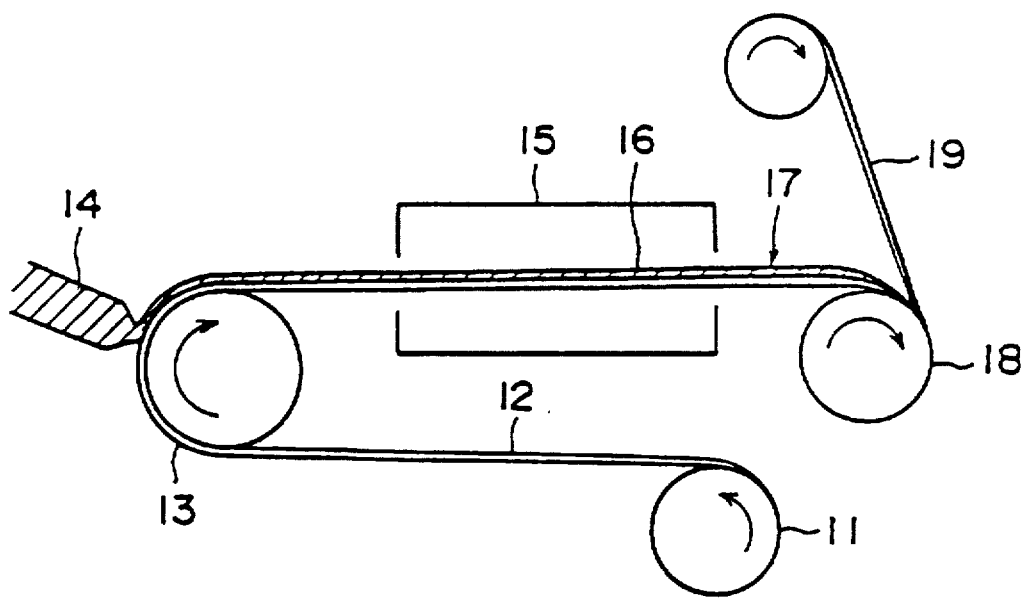
FIG. 1 schematically illustrates a system for forming a coated fluororesin layer on the transparent resin film of the continuous multi-layer sheet comprising the flexible base, the adhesive layer and the transparent resin film.

The process for the preparation of radiation image storage panel of the invention has the following characteristics. In the process of the invention, a protective film formed on the phosphor layer of the produced panel comprises a thin transparent film (made of plastic material) and a coated fluororesin layer provided thereon, and said protective film is beforehand prepared and then stuck onto the stimulable phosphor layer provided on the support. The present invention is mainly characterized by the procedure for forming the coated fluororesin layer: that is, the coated fluororesin layer is formed by coating a coating solution onto the thin transparent resin film beforehand backed with the thick flexible base for temporarily supporting the film during the coating procedure. With respect to this characteristic of the invention, a detailed description is given below.

A transparent resin film used as the protective film generally has the thickness of not more than 30 μm (usually not more than 20 μm), and a commonly used film has the thickness of 1 to 15 μm. Since such a resin film as described above is too thin to support itself, it is very difficult to evenly coat a fluororesin layer on the surface of the film. In order to solve this problem, in the present invention, the transparent film is temporarily fixed onto a thick flexible base, and then a fluororesin solution is coated on the film and dried to form the desired fluororesin layer having a uniform thickness and property. Consequently, the protective film comprising the transparent film and the coated fluororesin layer thus formed has both a thin thickness and a uniform property in the depth direction. After the coated fluororesin layer is formed, the transparent resin film is placed on the phosphor layer so that the other surface (the surface opposite to the surface coated with the coated fluororesin layer) of the film may be bonded to the surface of phosphor layer with the adhesive layer, and then sequentially pressed to be fixed. Thus, a protective film having an even thickness can be well-fixed onto the surface of phosphor layer.

Since the radiation image storage panel prepared by the process of the invention has the protective film thus prepared, neither stains nor abrasions are produced on the surface. Further, in the invention, the protective film is formed evenly enough to give a reproduced image of a high quality.

In the first step of the invention, a multi-layer sheet comprising a flexible base, an adhesive layer and a transparent resin film overlaid in this order is prepared. The protective film is prepared by forming a coated fluororesin layer on the transparent resin film of the multi-layer sheet.

Preferred examples of materials for the transparent resin film and the coated fluororesin layer are described in the copending U.S. Ser. No. 08/834,772 (which corresponds to Japanese Patent Provisional Publication No. 8(1996)-190000). Particularly preferred examples of material for the transparent resin film include polyethylene terephthalate, polyethylene naphthalate, and aramide resin. However, the materials are not restricted to them. Any other material can be employed as far as it has sufficient transparency and physical strength. The thickness of the transparent resin film is generally not more than 30 μm, preferably in the range of 1 to 15 μm, more preferably 5 to 12 μm.

The fluororesin layer is formed by the procedure comprising the steps of preparing a fluororesin solution in which a fluororesin is coated or dispersed in an organic solvent, coating the solution on the surface of the transparent resin film, and then drying the coated solution. In the above procedure, the fluororesin may be employed singly but usually it is used in a form of mixture with a resin having a high film-forming property. Further, oligomers having a polysiloxane structure and/or perfluoroalkyl group are also employable in combination. The coating procedure can be performed by such known coating means as doctor blade, roll coater and knife coater. The thickness of the fluororesin layer is generally in the range of 0.5 to 20 μm, preferably 1 to 5 μm.

Examples of the resins having high a film-forming property include polyurethane resin, polyacrylic resin, cellulose resin, polymethacrylate resin, polyester resin, and epoxy resin. Those resins are known as materials for the production of the conventional protective film.

The term "fluororesin" here means a homopolymer of olefin having fluorine (i.e., fluoroolefin) or a copolymer containing fluoroolefin as copolymerizing component. Examples of the fluororesins include polytetrafluoroethylene, polychlorotrifluoroethylene, polyvinyl fluoride, polyvinylidene fluoride, tetrafluoroethylene-hexafluoropropylene copolymer and fluoroolefin-vinyl ether copolymer.

Although most fluororesins are insoluble in organic solvents, some copolymers comprising fluoroolefin and a proper comonomer component are soluble in some organic solvents. The coating solution, therefore, can be prepared from the combination of the soluble fluororesin and a proper solvent, and the coated fluororesin layer can be easily formed by applying the solution onto the surface of the transparent resin film. Examples of the soluble fluororesin include a fluoroolefin-vinyl ether copolymer (particularly, fluoroethylene-vinyl ether copolymer). Further, polytetrafluoroethylene and its modified polymers are also soluble in a perfluoro solvent and accordingly they can be advantageously employed for forming the coated fluororesin layer in the manner described above.

In the preparation of the coated fluororesin layer, additives such as crosslinking agent, hardening agent and anti-yellowing agent can be employed. The crosslinking agent is preferably used to enhance the durability of the layer.

As is described above, an oligomer having a polysiloxane structure can be preferably used for the preparation of the coated fluororesin layer. Preferred examples of the oligomer include an oligomer having dimethylpolysiloxane structure and at least one functional group (e.g., hydroxyl group). The weight average molecular weight of the oligomer preferably is in the range of 500 to 100,000, more preferably 1,000 to 100,000 (particularly 3,000 to 10,000). An oligomer having a perfluoroalkyl group (e.g., tetrafluoroethylene) is also preferably employable, and the oligomer further having at least one functional group (e.g., hydroxy group) is particularly preferred. The weight average molecular weight of the oligomer preferably is in the range of 500 to 100,000, more preferably 1,000 to 100,000 (particularly 1,000 to 10,000).

If the material of the coated fluororesin layer contains the above-described oligomer, the oligomer reacts with fluororesin to crosslink during the formation of the layer. Consequently, the oligomer gives the radiation image storage panel having an increased durability for repeated use for long time. The oligomer is preferably used in an amount of 0.01 to 10 weight %, more preferably 0.1 to 2 weight % based on the amount of fluororesin.

The coated fluororesin layer can contain a perfluoroolefin resin powder or a silicone resin powder. The mean particle size of the powder preferably is in the range of 0.1 to 10 μm, more preferably 0.3 to 5 μm. The amount of the powder preferably is in the range of 0.5 to 30 wt. %, more preferably 2 to 20 wt. % based on the amount of fluororesin.

As the flexible base, a thick plastic sheet having a smooth surface is preferably employed. The thickness of the base is generally not more than 20 μm, preferably in the range of 30 to 300 μm. Examples of the material for the base include polyethylene terephthalate, polyethylene naphthalate, aramide resin and polyimide resin. The material for the base preferably is different from that of the transparent resin film, because the base is peeled from the transparent resin film at the later stage.

The adhesive layer temporarily bonds the flexible base to the transparent resin film. The adhesive used for the adhesive layer is not particularly restricted, but preferably it has a strong adhesion to the flexible base and, on the other hand, such proper adhesion to the transparent resin film that the resin film can be easily peeled from the base at the later stage. Examples of the adhesive include known adhesives such as adhesives of epoxy type, urethane type, acrylic type, and polyester type.

In the case that the above adhesive layer is also used as the adhesive agent layer which finally bonds the stimulable phosphor layer to the protective film (the transparent resin film), the adhesive layer is required to remain on the transparent resin film in the step of peeling the flexible base. In order to easily peel only the flexible base off, the adhesive layer is preferably formed on a releasing layer provided on the flexible base. The releasing layer can be easily formed by coating a silicone releasing agent on the base. Otherwise, the flexible base itself may be prepared from a resin having a high releasing property (e.g., silicone resin or fluororesin). The thickness of the adhesive layer (which temporarily bonds the flexible base to the transparent resin film) is generally in the range of 0.5 to 30 μm, preferably 1 to 15 μm.

A multi-layer sheet comprising above-described components such as the flexible base, the adhesive layer, the transparent resin film, and the coated fluororesin layer is prepared in the following manner.

First, the adhesive layer is formed on the flexible base by a known method, and then the transparent resin film is placed on the adhesive layer and pressed to be fixed. The multi-layer sheet preferably used for the invention is produced in a form of continuous belt, because a radiation image storage panel is generally produced in a continuous form and the produced continuous storage panel is then cut into pieces of the predetermined size. Accordingly, as a typical example of the invention, the process for the preparation of a continuous radiation image storage sheet is described below.

After a continuous multi-layer sheet comprising a flexible base, an adhesive layer and a transparent resin film is prepared and stored in a form of roll, the coated fluororesin layer can be formed on the transparent resin film in the system, for example, shown in FIG. 1. In the system, the continuous multi-layer sheet 12 is drown out from the roll 11, and then the transparent resin film 13 of the sheet is coated with a fluororesin solution by means of coating means 14 such as doctor blade while the sheet 12 is continuously moving. Subsequently after that, the continuous sheet 12 is transferred to drying zone 15 (using a hot fan dryer, for example) to evaporate the solvent and form a coated fluororesin layer 16. The continuous multi-layer sheet 17 having the coated fluororesin layer 16 is then sent to another roll 18. Before being sent to the roll 18, a protective film 19 is preferably provided so as to protect the coated fluororesin layer 16.

Figure 2:
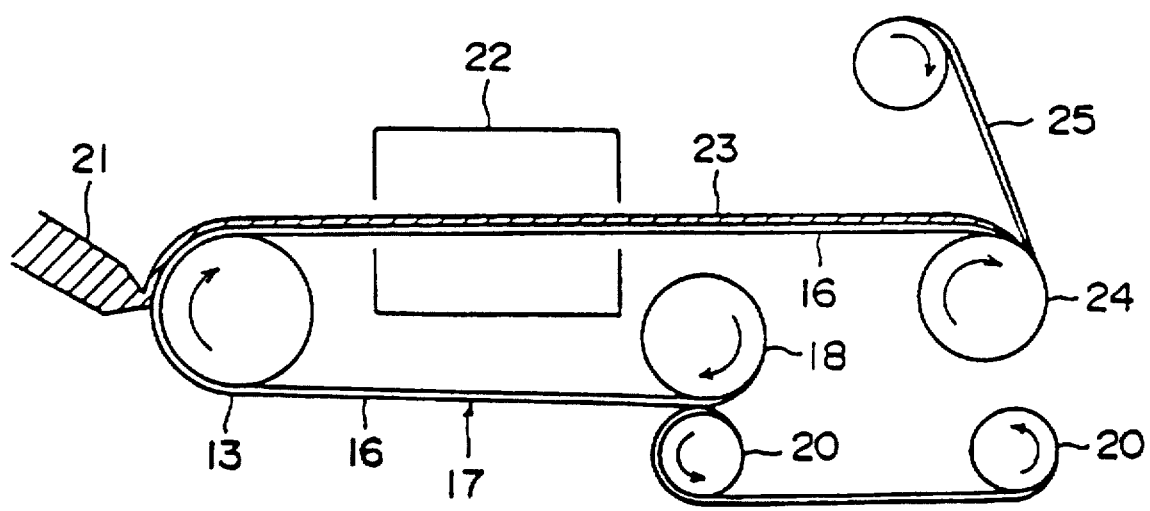
FIG. 2 schematically illustrates a system for peeling the flexible base, together with the adhesive layer, from the continuous multi-layer sheet comprising the flexible base, the adhesive layer, the transparent resin film and the coated fluororesin layer. In the system shown in FIG. 2, an adhesive layer is also formed, sequentially after peeling the base and the adhesive layer, on the bared surface (the reverse face of the coated fluororesin layer side) of the transparent resin film.

Next, the flexible base is peeled, alone or together with the adhesive layer, from the continuous multi-layer sheet comprising the flexible base, the adhesive layer, the transparent resin film, and the coated fluororesin layer. After that, if the adhesive layer is removed, an adhesive layer (which bonds the transparent resin film to the phosphor layer) is provided by coating an adhesive solution onto the bared surface of the transparent resin film. This procedure can be carried out, for example, in the system shown in FIG. 2. In the system, the continuous multi-layer sheet 17 having the coated fluororesin layer is drown out from the roll 18. At the same time or immediately after that, a flexible base is peeled together with the adhesive layer from the multi-layer sheet 17 by means of separator rolls 20. The transparent resin film 13 is then coated with a adhesive solution by means of coating means 21 such as doctor blade. Subsequently, the continuous sheet is transferred to drying zone 22 (using a hot fan dryer, for example) to evaporate the solvent and form an adhesive layer 23. The prepared continuous multi-layer sheet comprising the transparent resin film 13 having both the coated fluororesin layer 16 provided on one surface and the adhesive layer 23 provided on the other surface is then sent to another roll 24. Before being sent to the roll 24, a protective film 25 is provided so as to protect the adhesive layer 23. In the case that the adhesive layer is not removed, the adhesive layer is used to serve as the adhesive agent layer 23 of the finally produced radiation image storage panel.

The protective film 25 is then peeled from the continuous multi-layer sheet comprising the coated fluororesin layer 16, the transparent resin film 13, the adhesive layer 23, and the protective film 25. Independently, a stimulable phosphor sheet comprising a support and a stimulable phosphor layer provided thereon is prepared. After peeling the protective film 25 off, the continuous multi-layer sheet is stuck on the stimulable phosphor sheet so that the adhesive layer 23 may be in contact with the surface of the stimulable phosphor layer.

The above-mentioned stimulable phosphor sheet can be prepared in the known manner. Since both the constitution and the producing method of the phosphor sheet are known, only an example which is preferably employable for the invention is described below. The preferred stimulable phosphor sheet has a stimulable phosphor layer comprising a binder and a stimulable phosphor dispersed therein.

In the preferred stimulable phosphor sheet, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include europium or cerium activated alkaline earth metal halide phosphors and cerium activated oxyhalide phosphors.

The phosphor layer can be formed by coating a dispersion containing phosphor particles and a binder polymer in a proper organic solvent. In the coating dispersion, the binder polymer and the stimulable phosphor particles are contained generally in a ratio in the range of 1:1 to 1:100 (binder:phosphor, by weight), preferably 1:8 to 1:40 (by weight). As the binder polymer, a variety of resins are known and are employable for the present invention. The dispersion may be coated on the permanent support to directly form the phosphor layer. Otherwise, it may coated on a temporary support to form a sheet for the phosphor layer, and then the formed sheet is peeled from the temporary support and stuck on the permanent support. In that case, the sheet for the phosphor layer may be pressed under heating in the known manner. The thickness and the material of the support are also known and they can be optionally determined. Auxiliary layers such as a subbing layer and a light-reflecting layer may be provided on the support. The thickness of the phosphor layer is generally in the range of 20 μm to 1 mm, preferably 50 to 500 μm.

Figure 3:
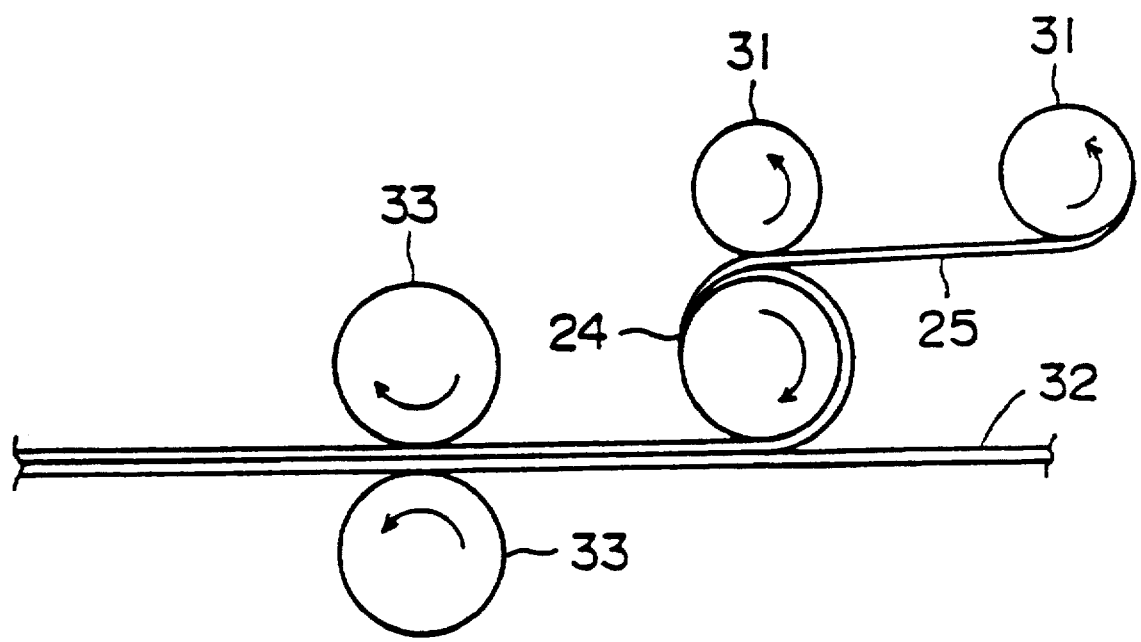
FIG. 3 schematically illustrates a system for sticking the continuous multi-layer sheet (comprising the adhesive layer, the transparent resin film and the coated fluororesin layer) onto the continuous stimulable phosphor sheet (comprising the support and the stimulable phosphor layer provided thereon), to form a continuous radiation image storage panel, that is, the coated stimulable phosphor sheet.

The procedure comprising the steps of peeling the protective film from the continuous multi-layer sheet (comprising the coated fluororesin layer, the transparent resin film, the adhesive layer, and the protective film) and then sticking the multi-layer sheet on the phosphor sheet can be carried out, for example, in the system shown in FIG. 3. In the system, the continuous multi-layer sheet is wound around the roll 24. Immediately after the continuous sheet is drown out from the roll 24, the protective film is peeled off by means of the separator rolls 31 and then the continuous sheet was superposed on the phosphor sheet 32 so that the bared surface may be in contact with the surface of the phosphor layer. Subsequently, the continuous multi-layer sheet and phosphor sheet 32 are passed together through the laminate rolls 33 so that both sheets are fixed to each other. In the case that the protective film is also provided on the coated fluororesin layer, the film is peeled off after the above laminating step.

The above prepared continuous multi-layer sheet (comprising the adhesive layer, the transparent resin film and the coated fluororesin layer provided, in this order, on the phosphor layer of phosphor sheet) is cut into pieces of the predetermined size to give the desired radiation image storage panel.

Since the radiation image storage panel produced by the present invention has a protective film comprising the transparent resin film and the coated fluororesin layer provided thereon, the panel exhibits excellent resistance against both stains and abrasions. Further, in the invention, the coated fluororesin layer is formed by coating the solution on the thin transparent resin film which is beforehand backed with the thick flexible base for supporting the film during the coating procedure, and therefore the coated fluororesin layer having uniform thickness can be prepared so evenly that the resultant radiation image storage panel gives a reproduced image of a high quality.

What is claimed is:

1. A process for the preparation of a radiation image storage panel comprising a support, a stimulable phosphor layer, an adhesive agent layer, a transparent resin film and a coated fluororesin layer, in order, which comprises the steps of:

preparing a multi-layer sheet comprising a flexible base, an adhesive layer and a transparent resin film overlaid in order;

forming a coated fluororesin layer on the transparent resin film of the multi-layer sheet;

peeling the flexible base, together with the adhesive layer, from the multi-layer sheet having the coated fluororesin layer;

forming an adhesive agent layer on the multi-layer sheet on the side having no coated fluororesin layer;

covering the adhesive agent layer of the multi-layer sheet with a protective film; and placing under pressure on a beforehand prepared stimulable phosphor sheet comprising a support and a stimulable phosphor layer the multi-layer sheet after removing the protective film therefrom so that the adhesive agent layer of the multi-layer sheet can be brought into contact with the stimulable phosphor layer.

2. The process of claim 1, wherein the transparent resin film is made of polyethylene terephthalate.

3. A process for the preparation of a radiation image storage panel comprising a support, a stimulable phosphor layer, an adhesive agent layer, a transparent resin film and a coated fluororesin layer, in order, which comprises the steps of:

preparing a longitudinal multi-layer sheet comprising a flexible base, an adhesive layer and a transparent resin film overlaid in order;

forming a coated fluororesin layer on the transparent resin film of the multi-layer sheet, while moving the sheet in its longitudinal direction;

peeling the flexible base, together with the adhesive layer, from the multi-layer sheet having the coated fluororesin layer, while moving the sheet in the longitudinal direction;

forming an adhesive agent layer on the multi-layer sheet on the side having no coated fluororesin layer, while moving the sheet in the longitudinal direction;

covering the adhesive agent layer of the multi-layer sheet with a protective film, while moving the sheet in the longitudinal direction;

placing under pressure on a beforehand prepared continuous stimulable phosphor sheet comprising a support and a stimulable phosphor layer the continuous multi-layer sheet after removing the protective film therefrom so that the adhesive agent layer of the multi-layer sheet can be brought into contact with the stimulable phosphor layer;

and cutting thus covered continuous stimulable phosphor sheet into pieces of the predetermined size.

4. The process of claim 3, wherein the transparent resin film is made of polyethylene terephthalate.

5. A process for the preparation of a radiation image storage panel comprising a support, a stimulable phosphor layer, an adhesive agent layer, a transparent resin film and a coated fluororesin layer, in order, which comprises the steps of:

preparing a multi-layer sheet comprising a flexible base, an adhesive agent layer and a transparent resin film overlaid in order;

forming a coated fluororesin layer on the transparent resin film of the multi-layer sheet;

peeling the flexible base from the multi-layer sheet having the coated fluororesin layer;

and placing under pressure on a beforehand prepared stimulable phosphor sheet comprising a support and a stimulable phosphor layer the multi-layer sheet after removing the protective film therefrom so that the adhesive agent layer of the multi-layer sheet can be brought into contact with the stimulable phosphor layer.

6. The process of claim 5, wherein a releasing layer is provided between the flexible base and the adhesive agent layer.

7. The process of claim 5, wherein the step of placing the multi-layer sheet on the stimulable phosphor sheet is performed by beforehand covering the adhesive agent layer of the multi-layer sheet with a protective film and placing the multi-layer sheet on the stimulable phosphor sheet while removing the protective film from the adhesive layer.

8. A process for the preparation of a radiation image storage panel comprising a support, a stimulable phosphor layer, an adhesive layer, a transparent resin film and a coated fluororesin layer, in order, which comprises the steps of:

preparing a continuous multi-layer sheet comprising a flexible base, an adhesive agent layer and a transparent resin film overlaid in order;

forming a coated fluororesin layer on the transparent resin film of the multi-layer sheet, while moving the sheet in its longitudinal direction;

peeling the flexible base from the multi-layer sheet having the coated fluororesin layer, while moving the sheet in the longitudinal direction;

placing under pressure on a beforehand prepared continuous stimulable phosphor sheet comprising a support and a stimulable phosphor layer the multi-layer sheet after removing the protective film therefrom so that the adhesive agent layer of the multi-layer sheet can be brought into contact with the stimulable phosphor layer, while moving the sheet in the longitudinal direction;

and cutting thus covered continuous stimulable phosphor sheet into pieces of the predetermined size.

9. The process of claim 8, wherein a releasing layer is provided between the flexible base and the adhesive agent layer.

10. The process of claim 8, wherein the step of placing the multi-layer sheet on the stimulable phosphor sheet is performed by beforehand covering the adhesive agent layer of the multi-layer sheet with a protective film and placing the multi-layer sheet on the stimulable phosphor sheet while removing the protective film from the adhesive layer.

* * * * *